United States Patent [19]

Brownell et al.

[11] Patent Number: 4,853,118
[45] Date of Patent: Aug. 1, 1989

[54] LIQUID FILTER

[75] Inventors: Peter Brownell, Providence; Joseph A. Borgia, Cranston; Robert Gabrielson, Smithfield, all of R.I.

[73] Assignee: Allied-Signal Inc., Morristown, N.J.

[21] Appl. No.: 219,411

[22] Filed: Jul. 15, 1988

[51] Int. Cl.⁴ .............................................. B01D 27/10
[52] U.S. Cl. ..................................... 210/130; 210/136; 210/440; 210/DIG. 17
[58] Field of Search ............... 210/117, 130, 133, 168, 210/437, 440, 443, 444, 493.5, 508, 136, 168, DIG. 17

[56] References Cited

U.S. PATENT DOCUMENTS

| | | | |
|---|---|---|---|
| 3,231,089 | 1/1966 | Thornton | 210/130 |
| 3,567,023 | 3/1971 | Buckman et al. | 210/130 |
| 4,127,484 | 11/1978 | Walulik et al. | 210/130 |
| 4,464,263 | 8/1984 | Brownell | 210/493.5 |
| 4,629,474 | 12/1986 | Thornton | 210/508 |

Primary Examiner—Ivars Cintins
Attorney, Agent, or Firm—Ken C. Decker; William N. Antonis

[57] ABSTRACT

A liquid filter for an internal combustion engine includes a filter cartridge housed within an outer shell closed by an end member. The end member provides a central outlet opening and circumferentially spaced inlet openings circumscribing the outlet opening and spaced radially therefrom. An annular fixture is mounted on the end closure between the outlet opening and the inlet openings and supports a circumferentially extending seal. The seal includes a central portion which seals between the fixture and the cartridge, and also includes a first radially projecting deflectable portion which prevents drainback of liquid filtrate through the inlet openings upon engine shutoff, and also includes a second deflectable portion which controls bypass flow. The fixture further includes axially projecting members which are engaged by the filter cartridge to hold the latter in fluid-tight engagement with the valve member.

16 Claims, 2 Drawing Sheets

LIQUID FILTER

This invention relates to a liquid filter to be used for example to filter the lubricating oil of an internal combustion engine.

Most liquid filters currently used to filter the lubricating oil of an internal combustion engine are of the so called "spin-on" type, in which a filtering media is housed within a metal casing which is threaded onto a mounting stud projecting from the engine block. Such filters commonly include a combination anti-drainback and relief valve. The anti-drainback valve prevents fluid from draining from the casing back into the engine when the engine is shut off, thereby preventing the engine from being starved of oil upon subsequent startup due to the fact that the filter casing must be pumped full of oil. The bypass valve opens at a predetermined pressure at which the pressure differential across the filtering medium becomes too great. Accordingly, the lubricating oil is then allowed to bypass the filtering media. However, such filters must be designed so that the filtering media normally does not permit the lubricating oil to bypass directly from the inlet to the outlet unless the relief valve is opened. Existing anti-drainback and relief valve designs are relatively complicated and require a number of parts, and a typical such design is disclosed in U.S. Pat. No. 3,567,022.

The present invention discloses a liquid filter for an internal combustion engine in which the number of component parts of the filter are substantially reduced, in that the bypass valve, the anti-drainback valve, and a seal between the filtering media and the housing are all effected by a simple resilient member mounted upon an annular fixture. The fixture includes a projecting portion which cooperates with the media to hold the media in fluid-tight engagement with the seal. In this way, the dimensional tolerances on the various parts can be made less restrictive, and the design of the various components facilitates their manufacture from plastic or other inexpensive matrials, and also permits a depth type filtering media, as opposed to the more common pleated paper filtering media, to be used.

These and other advantages of the present invention will become apparent from the following specification, with reference to the accompanying drawings, in which FIG. 1 is a cross-sectional view illustrating the preferred embodiment of the present invention;

Figure 1:
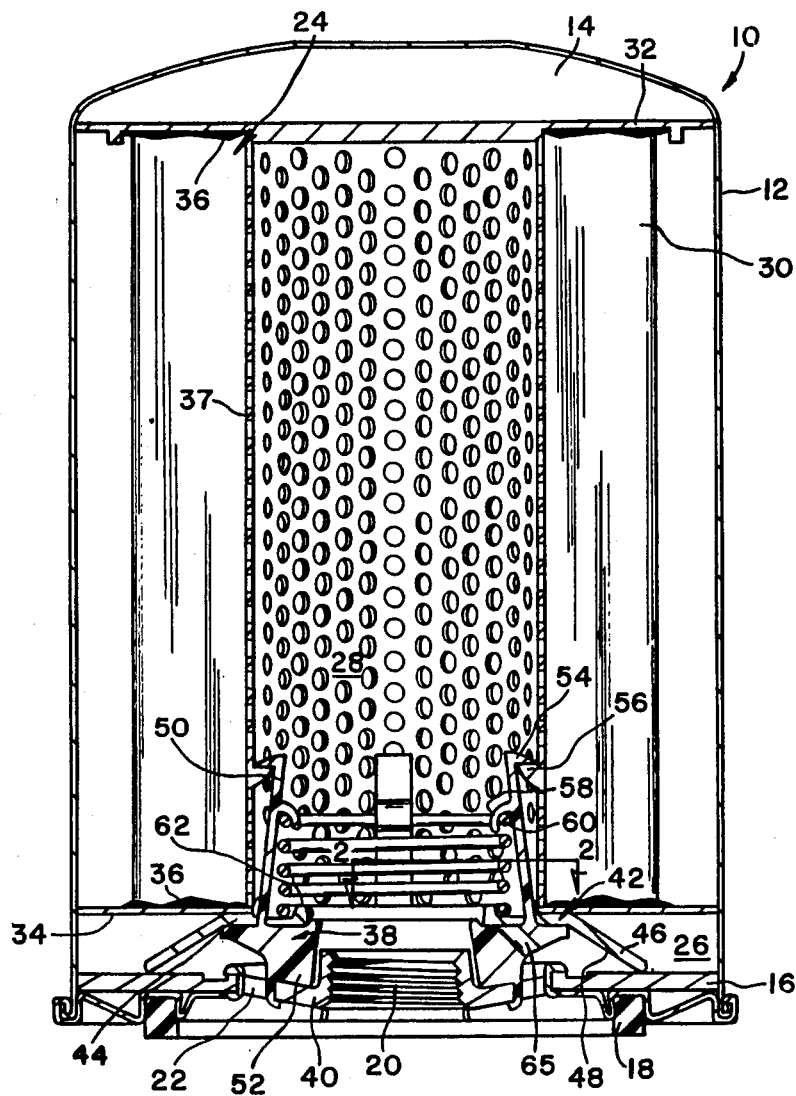
Figure 2:
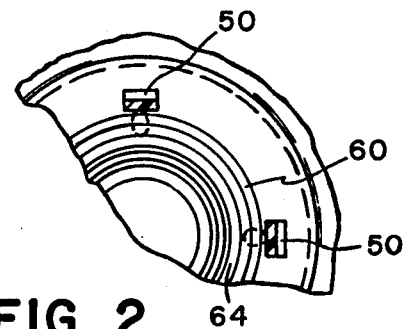
FIG. 2 is a cross-sectional view taken substantially along lines 2—2 of FIG. 1.

Referring now to the embodiment of FIGS. 1 and 2 of the drawings, a liquid filter generally indicated by the numeral 10 includes an outer shell 12 defining a cavity 14 therein. Housing 12 includes an end member 16 which carries an elastomeric seal 18 for sealing engagement with the engine block of the internal combustion engine upon which the filter 10 is installed. A threaded outlet opening 20 is coaxial with the axis defined by the housing 12 to permit "spin-on" attachment of the filter 10 on a threaded mounting stud (not shown) extending from the engine block, in a manner well known to those skilled in the art. Circumferentially spaced inlet openings 22 are offset radially from the outlet opening 20, and are spaced circumferentially thereabout.

A filter media cartridge generally indicated by the numeral 24 is received within the cavity 14, dividing the latter into an inlet chamber 26 communicating with the inlet opening 22 and an outlet chamber 28 communicating with the outlet opening 20. Filter media cartridge 24 includes a circumferentially extending array of radially tapering pleated filter paper generally indicated by the numeral 30. The pleated filter paper 30 is conventional, and is supported between an upper endcap 32, which bridges across the outlet chamber 28, and a annular lower endcap 34. The portion of the endcap 34 which extends radially outwardly beyond the pleats of the paper 30 is perforated to permit access of the liquid filtrate to the filter paper 30. A potting compound, generally indicated at 36 seals the ends of the pleats to the upper and lower end caps respectively.

The cartridge 30 is supported in the cavity 14 by an annular fixture generally indicated by the numeral 38. The fixture 38 circumscribes the outlet opening 20 and is secured to the circumferential extending portion 40 of the end member 16 defined between the outlet opening 20 and the circumferentially spaced inlet openings 22. The fixture 38 includes a circumferentially extending sealing surface 40 which supports an annular seal generally indicated by the numeral 42. The annular seal 42 includes a substantially flat, circumferentially extending, central sealing portion 44, which provides sealing engagement with the endcap 34 and with the sealing surface 40, to thereby prevent flow of the liquid filtrate around the filtering paper 30 into the outlet chamber 28. Seal 42 also includes a first deflectable portion 46 defined by circumferentially extending surface 48 which tapers axially from the fixture 38 toward the end member 16 to engage the latter at a point radially outwardly from the inlet openings 22 to thereby prevent drainback of the liquid filtrates from the inlet chamber 26 back through the inlet openings 22. Of course, this occurs only when the vehicle engine is shut off and the pressure at the inlet openings 22 drops; as long as the engine is operating, the pressure at the inlet openings 22 will overcome the resistance of the first deflectable portion 46, thereby urging it upwardly viewing the figure to permit flow of the liquid filtrate into the inlet chamber 26.

The fixture 38 further includes circumferentially spaced, axially projecting, radially deflectable arms 50 which project from the base 52 of the fixture 38 into the outlet chamber 28. Radially projecting detents 54, 56 on the arms 50 and on the screen 37 (which provides axial support to the cartridge 24) are positioned so that when the end member 16 is installed on the shell 12 the detents 54, 56 engage one another to provide loading on the cartridge in the axial direction, thereby partially compressing the central portion 44 of the seal 42 to thereby effect the fluid-tight seal mentioned hereinabove. A radially projecting barb 58 projects radially inwardly from the opposite side of the arms 50 from which the detent 54 projects and captures the end of a coil spring 60. The coils of the spring 60 extend circumferentially around the outlet chamber 28, and provide an axially loading force against a second deflectable portion 62 of the seal 42.

The second deflectable portion 62 comprises circumferentially spaced flaps extending radially inwardly from the central seal portion 44 of the annular seal 42, and project through the spaces defined between the arms 50. The inner circumferential surface of the second deflectable portion 62 terminates in an axially projecting barb 64 which captures the other end of the spring 60. The deflectable portion 62 and the spring 60 cooperate to control communication through circumferentially spaced bypass passages 65, which extend through the fixture 38 to permit bypass flow from the inlet chamber 26 directly to the outlet chamber 28 when the pleated paper 30 becomes so clogged with contaminants that the pressure differential between the inlet and outlet chambers 26, 28 attains a level sufficient to cause the force of fluid pressure acting in the passages 65 to overcome the force of the spring 60. Accordingly, the deflectable portion 62 thereupon deflects to permit flow through the passages 65, thereby preventing the engine on which the filter 10 is installed from being starved for lubricating oil due to the fact that the filtering paper 30 becomes clogged with contaminants.

In operation, the liquid filtrate communicates through the inlet openings 22 into the inlet chamber 26. Liquid communicates from inlet chamber 26 through the filter paper 30, which captures the contaminant particles entrained in the liquid filtrate on the surface of the paper in a manner well known to those skilled in the art. The liquid filtrate leaves the filter paper 30 and communicates into the outlet chamber 28, and then communicates back into the engine block through the outlet opening 20. As discussed hereinabove, drainback of the liquid filtrate upon engine shutoff is prevented by the deflectable portion 46 of the annular valve member 42, and bypass flow in the event of a clogged filter is provided by the passages 65 and the second deflectable portion 62. The filter is assembled by installing the cartridge 24 on the fixture 38, which has already been installed on the closure 16. The length of the arms 50 are such that the detents 54, 56 provide a slight compressive force against the central sealing area 44 of the annular valve seal 42, thereby preventing accidental bypass of the fluid around the cartridge. The assembly is then installed in the outer casing 12. Prior art filters of this same general type required a relatively complicated spring between the upper endcap 32 and the corresponding end of the housing to provide positioning and sealing of the filter cartridge 24. The device disclosed herein not only effects this seal in a more economical manner due to the fewer and less expensive parts required, but the length of the cartridge 24 compared to the length of the casing 12 is now made less critical, so that the tolerances on the casing 12 and the media cartridge 24 can be relaxed. Furthermore, the anti-drainback, relief, and cartridge sealing functions are provided by the relatively simple valve member 42, instead of the substantially more complex and complicated devices used by the prior art.

Another feature of the invention is that it is adaptable for use with different types of media and with housing made of different materials, for example plastic. Referring now to the embodiment of FIG. 3, where elements the same or substantially the same as those in the preferred embodiment retain the same reference character increased by 100, the outer shell 112 and end member 116 are made out of a plastic material, and are separated at the parting line generally indicated at P. The filter cartridge generally indicated by the numeral 124 consists of a depth type filtering media, instead of the surface type filtering media such as the pleated paper 30 in FIG. 1. The depth type media captures the contaminant particles throughout the depth of the media, instead of sieving the particles on the surface of the media as does the pleated paper 30. The media generally indicated at 166 is a dome shaped, molded mass of randomly arrayed fibers. The fibers comprising the media 166 are prepared and molded as more completely described in U.S. Pat. No. 4,629,474. Since the precise manner in which the fibers comprising media 166 are prepared and molded is disclosed in this patent, the process will not be described in detail herein.

The filter cartridge 24 further includes a perforated end cap 168, which is supported on the fixture 138 and seals against the central portion 144 of annular sealing member 142. The fixture 138 includes a cylindrical projecting member generally, indicated as at 169, which is provided with circumferentially spaced slots 170 which receives the flaps comprising the second deflectable portion 162 of the annular seal 142. The circumferentially extending surface 172 and radially extending surface 174 of the dome shaped media 166 are coated with an adhesive, which adheres to the projecting member 169 and the upper surface of the cental portion 144 of the seal 142, thereby effecting a fluid-tight seal against the projecting member 168 and against the seal 142.

Figure 3:
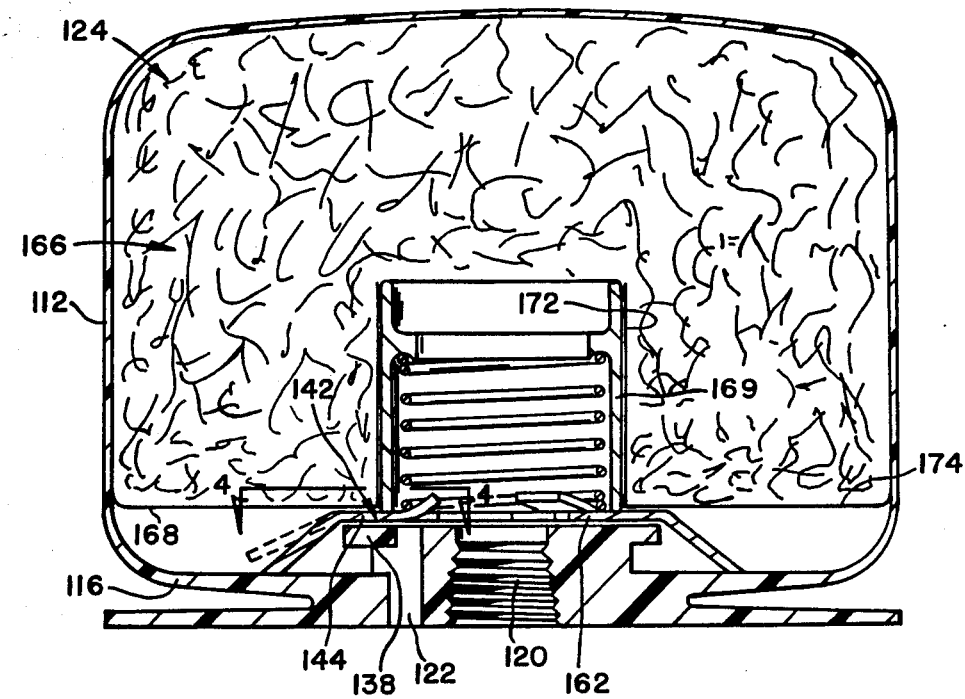
FIG. 3 is a view similar to FIG. 1 but illustrating another embodiment of the present invention.
Figure 4:
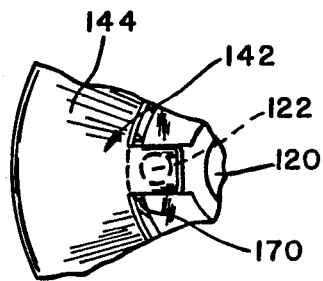
FIG. 4 is a cross-sectional view taken substantially along lines 4—4 of FIG. 3.

Accordingly, the design illustrated in FIG. 3 does not require the expensive upper endcap and supporting screen necessary in pleated paper cartridges. Although the operation of the filter illustrated in FIG. 3 is basically the same as that illustrated in FIG. 1, instead of being sieved by the filter paper 30, the contaminants are moved throughout the entire depth of the mass of fibers comprising the filter media 166 as the liquid filtrate flows through the media.

We claim:

1. Liquid filter comprising an outer shell defining a cavity therewithin, said cavity defining an axis, said shell having an end member, said end member defining an outlet opening coaxial with said shell for communicating liquid filtrate from said cavity, said outlet opening including means for attaching said shell to a fluid utilization device, circumferentially spaced inlet openings circumscribing said outlet opening and radially offset from the later with respect to said axis, a filtering media cartridge within said cavity dividing the latter into an outlet chamber communicating with the outlet opening and an inlet chamber communicating with the inlet openings, an annular fixture circumscribing said outlet opening and including projecting means projecting into said outlet chamber, passage means extending through said fixture for communicating the inlet with the outlet chamber, said fixture including a circumferentially extending sealing surface, and an annular valve member mounted on said sealing surface of the fixture, said valve member including a circumferentially extending central portion supported by said sealing surface of the fixture and providing a fluid tight seal with the media cartridge to prevent bypass of the liquid filtrate from said inlet chamber to the outlet chamber, means for holding the media cartridge in sealing engagement with the circumferentially extending central portion, said valve member including a first deflectable portion projecting from said circumferentially extending central portion into said inlet chamber for controlling communication of the liquid filtrate through said inlet openings and a second deflectable portion projecting from said circumferentially extending portion for controlling communication of the liquid filtrate through said passage means, said projecting means including a member projecting axially from said fixture into said outlet chamber, resilient means bearing against said projecting member and against said second deflectable portion to prevent deflection of the latter to permit fluid flow through the passage means until the pressure differential across the second deflectable portion exceeds a predetermined level, said axially projecting member including circumferentially spaced slots defining spaces therebetween, said second deflectable portion including circumferentially spaced flaps extending through said slots.

2. Liquid filter as claimed in claim 1, wherein said first deflectable portion is defined by a circumferentially exending surface tapering axially from said fixture toward said end member to engage the latter to prevent drainback of the liquid filtrate from said inlet chamber through the inlet openings.

3. Liquid filter as claimed in claim 1, wherein said media cartridge includes an inner circumferentially extending support member defining at least a portion of the outlet chamber and an end cap sealingly engaged with the media cartridge and extending from said support member to support said media cartridge, and cooperating means interconnecting the supporot member and said projecting member.

4. Liquid filter comprising an outer shell defining a cavity therewithin, said cavity defining an axis, said shell having an end member, said end member defining an outlet opening coaxial with said shell for communicating liquid filtrate from said cavity said outlet opening including means for attaching said shell to a fluid utilization device, circumferentially spaced inlet openings circumscribing said outlet opening and radially offset from the latet with respect to said axis, a filtering media cartridge within said cavity dividing the latter into an outlet chamber communicating with the outlet opening and an inlet chamber communicating with the inlet openings, an annular fixture circumscribing said outlet opening and including projecting means projecting into said outlet chamber, passage means extending through said fixture for communicating the inlet with the outlet chamber, said fixture including a circumferentially extending sealing surface, an annular valve member mounted on said sealing surface of the fixture, said valve member including a circumferentially extending central portion supported by said sealing surface of the fixture and providing a fluid tight seal with the media cartridge to prevent bypass of the liquid filtrate from said inlet chamber to the outlet chamber, means for holding the media cartridge in sealing engagement with the ciricumferentially extending central portion, said valve member including a first deflectable portion projecting from said circumferentially extending central portion into said inlet chamber for controlling communication of the liquid filtrate through said inlet openings and a second deflectable portion projecting from said circumferentially extending portion for controlling communication of the liquid filtrate through said passage means, said projecting means including a member projecting axially from said fixture into said outlet chamber, resilient means bearing against said projecting member and against said second deflectable portion to prevent deflection of the latter to permit fluid flow through the passage means until the pressure differential across the second deflectable portion exceeds a predetermined level, said media cartridge including an inner circumferentially extending support member defining at least a portion of the outlet chamber and an end cap sealingly engaged with the media cartridge and extending from said support member to support said media cartridge, and cooperating means interconnecting the support member and said projecting member, said cooperating means including means exerting an axially directed force to be exerted on said media cartridge to urge the media cartridge toward said end member, whereby said end cap is urged into sealing engagement with the central portion of said valve member.

5. Liquid filter as claimed in claim 4, wherein said means exerting an axially directed force include cooperating, locking detents on the support member and on said projecting member.

6. Liquid filter as claimed in claim 5, wherein said projecting member includes circumferentially spaced, radially deflectable arms extending axially from said fixture into the outlet cavity defined by said screen.

7. Liquid filter as claimed in claim 6 wherein said arms cooperate with one another to define slots therebetween, said second deflectable portion including circumferentially spaced flaps extending through said slots.

8. Liquid filter as claimed in claim 5, wherein said axially projecting member includes circumferentially spaced slots defining spaces therebetween said second deflectable portion including circumferentially spaced flaps extending through said slots.

9. Liquid filter as claimed in claim 5, wherein said first deflectable portion is defined by a circumferentiallly extending surface tapering axially from said fixture toward said end member to engage the latter to prevent drainback of the liquid filtrate from said inlet chamber through the inlet openings.

10. Liquid filter as claimed in claim 5, wherein said media cartridge is a circumferentially extending array of radially tapering pleats, each of said pleats having a radially inner edge, said support member circumscribing the radially inner edges of said pleats.

11. Liquid filter comprising an outer shell defining a cavity therewithin, said cavity defining an axis, said shell having an end member, said end member defining an oulet opening coaxial with said shell for communicating liquid filtrate from said cavity, said outlet opening including means for attaching said shell to a fluid utilization device, circumferentially spaced inlet openings circumscribing said outlet opening and radially offset from the later with respect to said axis, a filtering media cartridge within said cavity dividing the latter into an outlet chamber communicating with the outlet opening and an inlet chamber communicating with the inlet openings, said media cartridge including a support member at least partially defining said outlet chamber, an annular fixture circumscribing siad outlet opening and including projecting means projecting into said outlet chamber, means structurally connecting said projecting means with said support member for exerting an axially directed force on the media cartridge to urge the latter toward said end member, passage means extending through said fixture for communicating the inlet with the outlet chamber, said fixture including a circumferentially extending sealing surface, and an annular valve member mounted on said sealing surface of the fixture, said valve member including a circumferentially extending central portion supported by said sealing surface of the fixture and providing a fluid tight seal with the media cartridge to prevent bypass of the liquid filtrate from said inlet chamber to the outlet chamber, means for holding the media cartridge in sealing engagement with the circumferentially extending central portion, said valve member including a first deflectable portion projecting from said circumferentially extending central portion into said inlet chamber for controlling communication of the liquid filtrate through said inlet openings and a second deflectable portion projecting from said circumferentially extending portion for controlling communication of the liquid filtrate through said passage means.

12. Liquid filter as claimed in claim 11, wherein said media cartridge is a molded mass of randomly arrayed fibers, said mass defining a cavity therewithin comprising said outlet chamber.

13. Liquid filter as claimed in claim 12, wherein said projecting member extends into said cavity, and an adhesive securing the fibers comprising the media cartridge to said projecting portion.

14. Liquid filter as claimed in claim 13, wherein the means for holding the media cartridge on the central plortion of the valve member is an adhesive fastening the media cartridge to the valve member.

15. Liquid filter as claimed in claim 12, wherein said axially projecting member includes circumferentially spaced slots defining spaces therebetween, said second deflectable portion including circumferentially spaced flaps extending through said slots.

16. Liquid filter as claimed in claim 12, wherein said first deflectable portion is defined by a circumferentially extending surface tapering axially from said fixture toward said end member to engage the latter to prevent drainback of the liquid filtrate from said inlet chamber through the inlet openings.

* * * * *